(12) United States Patent
Yang et al.

(10) Patent No.: US 11,322,000 B2
(45) Date of Patent: May 3, 2022

(54) METHOD, SYSTEM AND APPARATUS FOR WAGERING ON GAME OUTCOMES

(71) Applicant: CLUB GAMING PTY LTD, Southbank (AU)

(72) Inventors: Dongming Yang, Laverton (AU); Paula Jean Stewart, Roxburgh Park (AU); Danielle Louise Morris, Southbank (AU); Joseph Ronald Crepaldi, Potts Point (AU); Mathew Tsang, Belmore (AU); Timothy William Barnett, Malvern East (AU)

(73) Assignee: CLUB GAMING PTY LTD, Southbank (AU)

( * ) Notice: Subject to any disclaimer, the term of this patent is extended or adjusted under 35 U.S.C. 154(b) by 0 days.

(21) Appl. No.: 16/487,606

(22) PCT Filed: Feb. 26, 2018

(86) PCT No.: PCT/AU2018/000027
§ 371 (c)(1),
(2) Date: Aug. 21, 2019

(87) PCT Pub. No.: WO2018/152567
PCT Pub. Date: Aug. 30, 2018

(65) Prior Publication Data
US 2020/0058195 A1 Feb. 20, 2020

(30) Foreign Application Priority Data
Feb. 24, 2017 (AU) .................................. 2017900617

(51) Int. Cl.
*G07F 17/32* (2006.01)
*G06F 17/18* (2006.01)

(52) U.S. Cl.
CPC .......... *G07F 17/3293* (2013.01); *G06F 17/18* (2013.01); *G07F 17/322* (2013.01)

(58) Field of Classification Search
None
See application file for complete search history.

(56) References Cited

U.S. PATENT DOCUMENTS

| 5,529,309 | A  | 6/1996  | Bartlett |
| 7,618,043 | B1 | 11/2009 | Hayden   |

(Continued)

FOREIGN PATENT DOCUMENTS

| AU | 2012202968 A1 | 6/2021 |
| CA | 2734004 A1    | 9/2012 |
| GB | 2402627 A     | 12/2004 |

OTHER PUBLICATIONS

International Search Report and Written Opinion, PCT/AU2018/000027, dated Mar. 19, 2018 (31 pp.).

(Continued)

*Primary Examiner* — James S. McClellan
*Assistant Examiner* — Peter J Iannuzzi
(74) *Attorney, Agent, or Firm* — Eversheds Sutherland (US) LLP

(57) ABSTRACT

The present application relates to a method and apparatus for wagering on games that involve the use of playing chips or tokens for wagering. In one form, the present application provides an apparatus for wagering on a game having predetermined rules adapted for at least one or more players to participate by wagering on game outcome events including a playfield having a gaming layout adapted for placement of game elements and a wagering layout adapted for accepting placement of at least one wager. The wagering layout including at least one indicium for accepting placement of an apportioned wager and at least one wagering token. One or a combination of the at least one wagering (Continued)

token and the at least one indicium of the wagering layout provides a single wager that has its value apportioned to a number of outcome events.

3 Claims, 4 Drawing Sheets

(56) References Cited

U.S. PATENT DOCUMENTS

| | | |
|---|---|---|
| 2005/0285336 A1 | 12/2005 | Ilievski |
| 2010/0171267 A1 | 7/2010 | Walker |
| 2015/0054220 A1* | 2/2015 | Brown ................ G07F 17/322 273/292 |
| 2015/0141126 A1 | 5/2015 | Hoyt et al. |
| 2016/0263472 A1 | 9/2016 | Chavez-Munoz |

OTHER PUBLICATIONS

Australian Patent Application No. AU 2004222759 A1, titled: Method and Device for Providing an Improved Tie Wager for the Game of Baccarat, dated Oct. 21, 2004 (27 pp.).

* cited by examiner

METHOD, SYSTEM AND APPARATUS FOR WAGERING ON GAME OUTCOMES

RELATED APPLICATIONS

This application claims priority to Australian Provisional Patent Application No. 2017900617 in the name of Club Gaming Pty Ltd, which was filed on 24 Feb. 2017, entitled "Method, System and Apparatus for Wagering on Game Outcomes" and the specification thereof is incorporated herein by reference in its entirety and for all purposes.

FIELD OF INVENTION

The present invention relates to the field of games. In particular, the invention relates to a method and apparatus for wagering on games that involve the use of playing chips or tokens for wagering. In preferred forms, the present invention relates to wagering on casino table games such as card games and finds particular use in the card game of Baccarat in which players or participants can bet on either a Bank outcome or a Player outcome. It will be convenient to hereinafter describe the invention in relation to a wagering method, system and apparatus using rules for the play of Baccarat, however it should be appreciated that the present invention is not limited to that use, only. Moreover, the invention may find application in casinos, gaming venues, cruise ships, online gambling sites, and also in non-gambling sites, as well as games provided for social media websites, personal computers and mobile applications.

BACKGROUND ART

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

Baccarat is a casino card game and it is considered to have originated in Italy and been introduced to the world via France over 500 years ago. The name "Baccarat" is unusual in that the game is named after the worst hand, worth 0. The highest score that can be achieved is 9 (from a 4 and 5, 10 and 9, or A and 8, etc). Whilst there are a number of variants of the game, basically Baccarat in its most prevalent forms may be described, by way of example, as follows.

Baccarat is a simple game with, for example, three possible outcomes, namely, 'Player' win, 'Banker' win, and 'Tie'. However, it is to be noted that the term 'Player' does not refer to the customer or participant, and the term 'Banker' does not refer to the house. They are just options on which the participants can bet and, as such, 'Player' and 'Banker' are essentially two nominal entities or surrogate players who oppose each other. In the context of this description, if reference is made to "player" in lower case it is to be taken as reference to a participant in the game and not the notional surrogate Player, which will be referenced by use of a capital P for Player. The casino or house takes the opposite position of each wager placed by the participant. With typically up to 12 or more playing positions at a Baccarat table, a participant may place his or her wager in one of several manners: (1) with the Banker, (2) with the Player, and/or (3) with a Tie result. The Player's objective is to get a hand that has a score which is closer to 9 than the Banker's. An exemplary table layout in accordance with known related art is shown in FIG. 1.

After the placing of wagers, as with the Banker or Player, two initial cards are dealt to each of the surrogates, Player and Banker. The game is played modulo ten, that is, if the total value sum of a hand equals or exceeds 10, then 10 is subtracted from the total, i.e., only the last digit is used as the value of the hand. In this way, hands will always have a value of between 0 and 9. Aces have a value of 1, 10's and face cards a value of 0. All other cards have their face value.

If the Player's (or Banker's) initial two card values have a sum or value of 8 or 9, those cards are turned over immediately. The other must do likewise and the hands are resolved. A 9 wins over any lesser total. If neither the Player nor Banker has a 9, then 8 wins over any lesser total. Ties can be played as a stand-off or alternatively a push. If neither the Banker nor Player initial cards have a count of 8 or 9 (requiring immediate exposure of the hands and a resolving of the scores), then the Player has the next play and must stand or draw a third card according to predetermined rules that are dependent on the variant of the game and generally based on the odds of bettering the Banker's initial hand count relative to the Player's possible final hand count. They may be fixed rules.

If a third card is drawn, its value is added to the values of the initial cards, modulo ten, to arrive at the Banker's final count. If no third card is drawn, the Banker's initial count becomes the Banker's final count. Once play is completed by the Banker, the final hands are turned over and resolved with the hand with the final count closest to 9 deemed the winner. Wagers are then paid even money to all those who wagered with the victorious Banker or Player. Wagers with the loser are collected by the house. If ties are a push, no one wins or loses. Since the odds favour the Banker, a house commission, say 5%, may be collected by the casino on winning bets placed with the Banker.

Variants to the game may include facilitating participants wagering on outcome events like a run of Player, Banker or Tie results or in an example play known as a 'Pairs' event where a win occurs if the first two cards dealt to the Player or the Banker (as nominated by the player) constitute a pair and loses on all other outcomes. In the Pairs variation, players may place a wager on Player Pair, Banker Pair or both. Alternatively, a wager may also be placed on the Tie event occurring.

In casino gaming, it is difficult to arrange systems and methods which both attract players and provide appropriate returns to both the casino and the participants. Depending on the circumstances it is also important that participants feel that the game is fair and that appropriate rewards are provided for wagers given particular events.

In Baccarat, there are no choices effectively and the game's events are predicated by the cards as they are dealt. Moreover, the dealing of the cards or when the Player or Banker stands is governed by the predetermined rules noted above and, all those participants wagering with the Player (or Banker) are bound by the play and luck of their surrogate hand.

In one known exemplary form, despite its simplicity (or perhaps because of it), the punto banco version of Baccarat offers some of the lowest house advantage available in a casino. The Player bet has a house advantage of 1.24%, and the Banker bet (despite the 5% house commission) has a house advantage of 1.06%. The tie bet has a much higher house advantage of 14.44% (when using six decks) or 14.36% (when using eight decks). As would be appreciated by the person skilled in the art, these house advantage figures may also apply to similar wagers within other forms of the game of Baccarat noting that the actual values may change according to factors such as, for example, whether six or eight decks of cards are involved.

Because of its attraction for wealthy "high roller" players, a casino may win or lose millions of dollars a night on the game. On this point alone, it can be disadvantageous for a casino in the event cheating occurs at the Baccarat table.

Whilst Baccarat at its essence is a simple game, the implementation of the game or facilitating any number of its variants may introduce delays and complication to the game. As with a number of other casino table games it would be desirable to maintain the essential simplicity at the heart of the table game during its implementation to maintain participant interest and maximise turnover of wagers placed for the benefit of the casino.

With reference to the placement of bets on table games there may, at times, be a need for the conversion of participants' chips or tokens to allow the placement of a multiple bet. This may cause the introduction of delays into the play of a game and/or the consumption of valuable resources such as dealer time, which contributes to a lower turnover of bets that may cause one or a combination of reduced interest (or even frustration) with participants and a reduction in turnover for a casino establishment. A particular example of this comes in the form of a play of Baccarat in which a wager on a 'Pairs' outcome involves patrons to ask the dealer to convert chips, for example, convert a $100 chip into four $25 chips, which they then use to place simultaneously on the eventualities of a Banker Pair, (1×$25 chip), a Player Pair (1×$25 chip) and Tie (2×$25 chip). Such a multiple bet in Baccarat is known as One One Two. In this instance, the physical actions involved in the conversion of chips consumes valuable dealer time, reducing the number of bets placed per round on a crowded table. Furthermore, as a consequence of these delays being compounded by dealer inefficiencies, patrons may also be likely to actually miss a round of betting.

Some specific examples of betting variations in the prior art are exemplified as follows.

UK patent publication No. GB 2402627 (Pavey) discloses a roulette table layout having additional betting areas for split bets. One of the betting areas corresponds to a plurality of split bets and the other corresponds to a number of split bets and at least one corner bet. The roulette player will win if any of the numbers covered by the split bets occurs. The area corresponding to the split bets alone is the same as the exotic roulette Tierre or Short Series or Tires du Cylindre bet. The area corresponding to a number of split bets and at least one corner bet corresponds to a Voisin plus one bet which is similar to a standard Voisin, Long or Grand Series bet, but also includes the 1-wheel area. These combined betting areas, which combine up to 5 or 6 bets, do not pay a proportional amount for a spilt or corner and it is considered the disclosed game pays relatively lower odds.

US patent publication No. US 2005/0285336 (Ilievski et al) discloses an alphabetic roulette game which includes a roulette wheel having twenty-five positions thereon, comprising the twenty-six letters of the Roman alphabet and a double letter position. A wagering surface or table provides for the placement of wagers upon the chance of any of the single letters (or the double letters) or a letter of any of several groups of letters turning up on a spin of the wheel. The game also provides for wagers on the chance of a given letter turning up on two or more consecutive turns of the wheel. A further wagering opportunity is provided for wagering upon the chance of a letter within a given word or words (e.g., "LITTLE WHEEL") coming up on a turn of the wheel. The alphabetic positions on the wheel, and corresponding positions on the table, may be coloured to allow players to place wagers on a colour or colours, as desired. Ilievski provides similar betting areas to a traditional roulette wheel with the exchange of numbers for alphabetical letters. One different betting option Ilievski provides for is the combination of 6 letters to spell a word "Little Wheel". Little wheel is wagering the next letter to be spun will form part of the words. Ilievski provides a combination bet of 6 possible outcomes. This combination of wagers has its specific set of odds e.g. 3 to 1. As with Pavey, discussed above, this combined betting area does not pay a proportional amount for the individual letters that form the combined bet (25 to 1).

US patent publication No. US 2016/0263472 (Chavez-Munoz) discloses an enhanced roulette game with added wagering options for betting on a live roulette game using a conventional roulette wheel and playing surface and for betting on virtual or electronic representations of a roulette game. The numerical sequence on the roulette wheel is divided into four non-equal sections, each section containing a set sequence of numbers corresponding to numbers marked on the roulette layout and allowing for one additional ten (10) chip "straight up" and "split" bet; one additional eleven (11) chip "straight up" bet; and one additional eleven (11) chip "straight up" and "split" bet. In the course of the play of the roulette games, musical notes are triggered by winning numbers. As such, Chavez-Munoz creates an additional betting series from conventional roulette using the addition of musical notes and animations to accompany the new betting series. It involves a certain amount of complexity because it combines up to 10-11 bets into one.

With respect to table games in more general terms, US patent publication no. US2010/0171267 (Walker) introduces the concept of bet re-characterizations. The player places an initial wager on an event within the game, and, after learning information about an intermediate outcome of the game, the player is afforded the opportunity to change the initial wager in some manner. This change may be denoted with a token that sits on top of the initial wager. The odds on the re-characterized wager may be more or less favourable for the player. By way of illustration and example, if a bettor places a wager on Banker, and after the initial deal no longer thinks banker will win, the bettor has an option to 're-characterise' their bet to now be betting that there will be a pair result. Another example is after the initial deal the bettor thinks their current chosen hand will still win, they can 're-characterise' their bet to win +2 points. There are numerous ways a bettor can change their wager to increase odds. So, the 're-characterise' is acted on in the middle of the round of play of the main Baccarat game and furthermore, is not a side bet, as such.

US patent publication No. US 2015/0141126 (Magnet Consulting, Inc.) is directed at a means of tracking different players bets on a table and, in particular, involves a system and method of locating gaming tokens on a gaming table. Two sets of overlapping antennas are arranged in intersecting directions. The system uses the data from intersecting antennas to determine the positions of the gaming tokens. Having overlapping antennas reduces dead spots where player tokens may be mixed up and indistinguishable from each other as to what players are associated with respective tokens.

With the above discussion in mind, it would be desirable to provide a wagering system for table games which would attract an increased number of participants and/or increase the level of participation of existing participants without increasing the likelihood of making the game vulnerable to decreased benefit for the house or for that matter, dishonest play. However, as with the example of Baccarat noted above, it would also be desirable to maintain simplicity of a game to prevent participants from becoming confused or disillusioned by having to bear with unnecessary delays in play whilst remain abreast of new rules or an increase in the number of rules for the game.

SUMMARY OF INVENTION

It is an object of the embodiments described herein to overcome or alleviate at least one of the above noted drawbacks of related art systems or to at least provide a useful alternative to related art systems.

In accordance with the present invention, there is provided a method, apparatus and system for wagering on a game having predetermined rules adapted for at least one or more players to participate by wagering on game outcome events.

In one aspect of embodiments disclosed herein there is provided a method of wagering in a game having predetermined rules adapted for at least one or more players to participate by wagering on game outcome events, the method comprising:

at least one player placing a single wager;
apportioning the value of the single wager to a plurality of outcome events.

Preferably, the step of apportioning comprises allocating a predetermined fraction of the total value of the single wager to each of the plurality of outcome events.

The predetermined fraction of the total value of the single wager allocated to each of the plurality of outcome events may be one of:

the same amount for each event;
a different amount for each event;
an arbitrary amount for each event.

Alternatively, the predetermined fraction of the total value of the single wager allocated to each respective event may be based on a relationship with the probability of the occurrence of that event. In this respect, the relationship between the predetermined fraction of the total value of the single wager allocated to each respective outcome event and the probability of the occurrence of that event may be one of:

an inverse proportional relationship, or;
a directly proportional relationship.

In the method outlined above in accordance with preferred embodiments, the game is a table based game. Preferably, the game is Baccarat.

In a preferred example of Baccarat the single wager may be directed to a set of Pairs events in Baccarat and the value of the single wager is apportioned to the set of events as follows:

Banker Pair—25%
Player Pair—25%
Tie—50%.

In another aspect of embodiments disclosed herein there is provided apparatus for wagering on a game having predetermined rules adapted for at least one or more players to participate by wagering on game outcome events comprising:

a playfield including a gaming layout adapted for placement of game elements and a wagering layout adapted for accepting placement of at least one wager, the wagering layout comprising at least one indicium for accepting placement of an apportioned wager;

at least one wagering token;
wherein one or a combination of the at least one wagering token and the at least one indicium of the wagering layout provides a single wager that has its value apportioned to a plurality of outcome events.

In preferred embodiments, the game elements are playing cards.

Furthermore, embodiments of the present invention envisage an automated system for wagering on a game according to the method as disclosed herein.

The table game adapted for use in preferred embodiments may be a card game using at least one standard deck of playing cards.

Other aspects and preferred forms are disclosed in the specification and/or defined in the appended claims, forming a part of the description of the invention.

In essence, embodiments of the present invention stem from the realization that by way of providing a function of apportioning the value of a single chip to a plurality of game outcome events, then the delays caused by converting a player's chip to individual chips for each of the plurality of outcomes that players decide to wager on can be obviated. For example, at a crowded Baccarat table, not all patrons can place their bets as valuable dealer time is spent on exchanging chips instead. This reduces the potential revenue a Baccarat table can generate within a given time frame, and could also frustrate players. With the realisation of the present invention as noted above, the time taken to exchange chips can be greatly reduced or removed with an amendment to existing gaming equipment such as Baccarat table designs and/or individual chips/tokens delineated with multiple denominations.

Embodiments of the present invention provide the following advantages:

Saves time resulting in more bets per round of play.
By allowing for more bets per round of play, increases total potential revenue per round
The payout values on the One One Two bet in Baccarat are easy for the dealer to calculate and distribute with existing chips (i.e. where payouts may all be divisible by a single denomination, eg $25)
Reduces risk of incorrect exchanges, particularly when the operation of converting chip value is predetermined.
Does not slow or intrude on traditional games.
With respect to Baccarat, traditional tie and pair betting boxes remain such that there is no introduction of additional complexity for players.
Patrons are already familiar with the betting arrangements but can now enjoy a more efficient play.
Patrons are less likely to miss a round of betting due to dealer inefficiency.

BRIEF DESCRIPTION OF THE DRAWINGS

Further disclosure, objects, advantages and aspects of preferred and other embodiments of the present invention may be better understood by those skilled in the relevant art by reference to the following description of embodiments taken in conjunction with the accompanying drawings, which are given by way of illustration only, and thus are not limitative of the disclosure herein, and in which.

DETAILED DESCRIPTION

Figure 1:
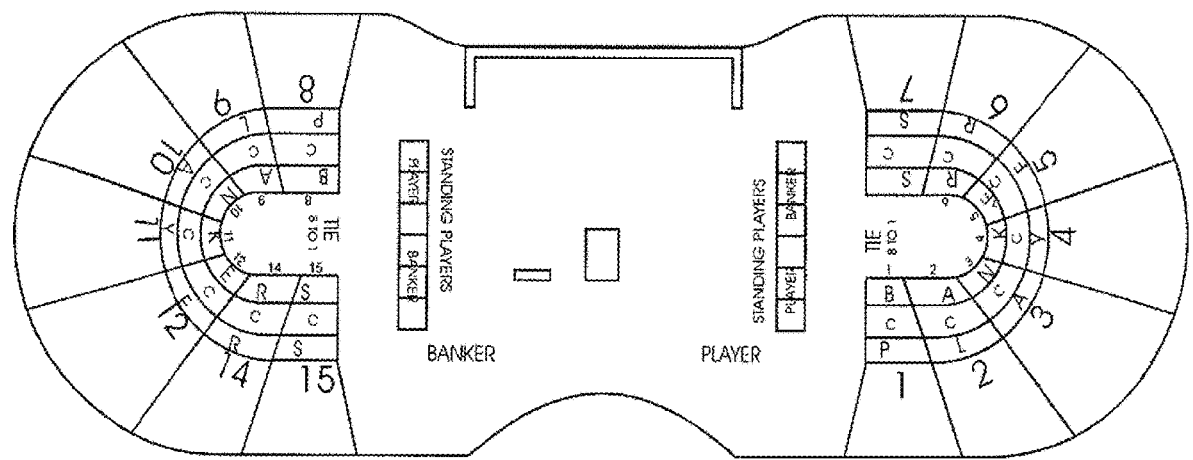
FIG. 1 illustrates an example table layout for the game of Baccarat in accordance with known art.

A preferred embodiment of the invention will be described with reference and in the context of the casino table game of Baccarat. However, as noted, embodiments of the present invention may find application in casinos, gaming venues, cruise ships, online gambling sites, and also in non-gambling sites, as well as use in games provided for social media websites, personal computers and mobile applications.

The present invention in its embodiments enhances the wagering on a game having predetermined rules adapted for at least one or more players to participate by wagering on game outcome events. In games suited for preferred embodiments of the invention, at least one player places a single wager and the wagering on the game is enhanced by a method and means for apportioning the value of the single wager to a plurality of outcome events.

The step of apportioning may comprise allocating a predetermined fraction of the total value of the single wager to each of the plurality of outcome events.

There are any number of ways to carry out the apportionment and allocation of the predetermined fractions of the single wager. For example, the predetermined fraction of the total value of the single wager allocated to each of the plurality of outcome events may be one of: the same amount for each event; a different amount for each event; or an arbitrary amount for each event. In preferred embodiments, the apportionment and allocation of the predetermined fractions of the single wager are completely arbitrary and/or dependent on external game factors, for example, patron preference(s). Alternatively, it is envisaged that an embodiment could provide for the predetermined fraction of the total value of the single wager allocated to each respective event being based on a relationship with the probability of the occurrence of that event. With this, the relationship between the predetermined fraction of the total value of the single wager allocated to each respective outcome event and the probability of the occurrence of that event could be one of: an inverse proportional relationship; a directly proportional relationship. Preferred embodiments of the invention may be implemented in table based games.

Apparatus for wagering on a game in accordance with preferred embodiments comprises a playfield including a gaming layout adapted for placement of game elements and a wagering layout adapted for accepting placement of at least one wager, the wagering layout comprising at least one indicium for accepting placement of an apportioned wager; at least one wagering token; and wherein one or a combination of the at least one wagering token and the at least one indicium of the wagering layout provides a single wager that has its value apportioned to a plurality of outcome events.

In an exemplary form of Baccarat, as would be understood by the person skilled in the art, wagers may be made on one or a combination of the Player hand, the Banker hand, the Tie and where offered by local or custom forms of the game, Player Run; a Banker Run, a Player/Banker Run, or a Tie Run, or Pairs events where a win occurs if the first two cards dealt to the Player or the Banker (as nominated by the player) constitute a pair and loses on all other outcomes. In the Pairs variation, players may place a wager on Player Pair, Banker Pair or both. Alternatively, a wager may also be placed on the Tie event occurring. Various forms of side wager may be offered and these are considered to be well understood by the person skilled in the art. Examples of side wagers may be found in a number of published patent specifications, such as, lapsed Australian Patent Application No 57194/96 (Bartlett) and, Australian Patent Application No 2004222759 (Shenli Ko).

With reference to FIG. 1, the game of Baccarat may be played utilising the table layout as shown in FIG. 1 in accordance with the following description.

Dealing the Game

In a typical form of play provided to casino participants by the present applicant, a Baccarat game may be dealt using one of the following methods:—

(A) The Dealer may deliver both the Player hand and the Banker hand to the highest wagerer on these hands. Initially if the player with the highest wager on either the Player or the Banker refuses to accept the cards for that hand, the Dealer may offer those cards to the next highest wagerer on that hand. In the event that two or more players have made an equal highest wager on either the Player or the Banker the Dealer may first offer the cards to that player with the equal highest wager who occupies the lowest numbered seat. If that player refuses to accept the cards the Dealer may offer the cards anticlockwise to the next person with the highest equal wager. Markers denoting "Player" and "Banker" may be placed in front of the player accepting the cards on the Player hand and the Banker hand respectively. In the event that no player accepts either the Player cards or the Banker cards, the Dealer may retain the cards. The players may handle only one set of cards, either the Player hand or the Banker hand at any one time. Where the Dealer is required to open either the Player hand or the Banker hand, a player acting as either the Player or the Banker for the purposes of opening the cards may request to open both hands in turn either Player then Banker or Banker then Player. The Dealer must ensure that the hands are kept clearly separated. A player who accepts the cards may authorise another person seated at the table (whether or not that person has placed a wager) to open one or more of the cards.

(B) The Dealer will retain the dealing shoe and act as both the Player and the Banker for the purpose of dealing the cards.

In this circumstance, the Dealer has control over the dealing of the cards without any input from players.

(C) The dealing shoe may be offered to the seated player with the highest wager on either the Player or the Banker. In the event that two or more players have made an equal highest wager on either the Player or the Banker, the Dealer may first pass the cards to that player with the equal highest wager who occupies the lowest numbered seat. Should all players decline the dealing shoe then the game may be dealt in accordance with rule (A), above or rule (B) above. The first player to accept the dealing shoe may act as the Player or Banker for the purpose only of dealing the cards and receiving and playing the appropriate hand/s.

A player who accepts the dealing shoe may authorise another person seated at the table (whether or not that person has placed a wager) to deal the cards; and a player who accepts the dealing shoe may authorise another person seated at the table (whether or not that person has placed a wager) or the Dealer to open one or more of the cards.

The Dealer may place a marker denoting "Player" or "Banker" beside the dealing shoe to denote that those cards will be retained by the player controlling the shoe. The player holding the dealing shoe may draw the cards from the dealing shoe ensuring that the cards remain in full view of the Dealer and Game Supervisor at all times. Under no circumstances must he/she allow the cards to leave the table.

When one hand is to be opened by a player other than the player holding the dealing shoe, the appropriate hand may be passed face-down to the Dealer who in turn may deliver the cards to the player opening the cards.

When the cards have been turned over by the player/s or the Dealer, the initial Player and Banker hands may be placed in the appropriate area of the table layout. Any further cards drawn to either hand may be dealt by the player holding the shoe and exposed by the relevant player/s or the Dealer. Once the card/s are exposed, they may be placed on the appropriate area of the table layout.

A player accepting the dealing shoe may retain control of the dealing shoe until: He/she elects to relinquish control; or His/her wager loses; or He/she is directed to relinquish control of the shoe by the Pit Boss.

Where the Dealer is required to open either the Player hand or the Banker hand, a player acting as either the Player or the Banker for the purposes of opening the cards may request to open both hands in turn either Player then Banker or Banker then Player. The Dealer must ensure that the hands are kept clearly separated.

The Initial Deal

There may be two hands dealt, namely, the Player hand and the Banker hand. Prior to any cards being dealt from the dealing shoe, the Dealer:—(a) May announce that no more bets may be placed; and (b) May burn a card.

Four cards may be dealt from the dealing shoe face-down or face-up, at the discretion of the Game Supervisor. The first and third cards may respectively represent the first and second cards of the Player hand and the second and fourth cards dealt may respectively represent the first and second cards of the Banker hand.

The Play

After the initial deal the Dealer may determine which hand will be exposed first, ie. Player then Banker or Banker then Player. The Dealer may announce the point count of each hand as it is displayed and if required, further cards may be dealt either face-up or face-down in accordance with predetermined rules as discussed below under "The Table of Play". Under no circumstances may more than one additional card be dealt to either hand. The Dealer may announce the result of the hand. The order of merit of hands may be:

(a) A point count of nine;
(b) A point count of eight;
(c) A point count of seven; and
(d) So on down to a point count of Baccarat.

When the cutting card appears during the course of play the Dealer may: —(a) Remove the cutting card and place it on the table layout to the side; and (b) Complete any coup which is in progress; and (c) Indicate that the next coup is to be the last coup upon which wagers may be placed. (d) Following the completion of this coup, the Game Supervisor may direct that one or more Dummy Coups be dealt; and (e) Following completion of the last coup of the shoe, the cards may be shuffled in accordance with predetermined rules or pre-shuffled cards introduced to the table. Where in the context of this description "coup" means a round of play comprising a Player hand and a Banker hand.

The Table of Play

After the initial four cards have been dealt, if the point count of the Player hand or the Banker hand is 8 or 9, no more cards will be dealt to either hand. If the point count of the Banker hand is 0 to 7 inclusive, the Player hand may:—Draw; or Stand; in accordance with the requirements of Table 1 below.

TABLE 1

| Player Hand | |
|---|---|
| When the first two cards total: | |
| 0-1-2-3-4-5 | Draws a card |
| 6-7 | Stands |
| 8-9 | Natural - No more cards are drawn to either hand. |

The Banker hand may:—Draw (ID); or Stand (S); in accordance with the requirements of Table 2 below.

TABLE 2

| Banker Hand | | | | | | | | | | | |
|---|---|---|---|---|---|---|---|---|---|---|---|
| Banker | Value of Third Card Drawn by Player Hand | | | | | | | | | | |
| Point Count | No Card | 0 | 1 | 2 | 3 | 4 | 5 | 6 | 7 | 8 | 9 |
| 0 | D | D | D | D | D | D | D | D | D | D | D |
| 1 | D | D | D | D | D | D | D | D | D | D | D |
| 2 | D | D | D | D | D | D | D | D | D | D | D |
| 3 | D | D | D | D | D | D | D | D | D | S | D |
| 4 | D | S | S | D | D | D | D | D | D | S | S |
| 5 | D | S | S | S | D | D | D | D | D | S | S |
| 6 | S | S | S | S | S | S | S | D | D | S | S |
| 7 | S | S | S | S | S | S | S | S | S | S | S |
| 8 | S | S | S | S | S | S | S | S | S | S | S |
| 9 | S | S | S | S | S | S | S | S | S | S | S |

Settlement

The bets which may be placed in respect of a coup and the odds payable for them are formulated in accordance with predetermined criteria that may be prescribed under relevant guidelines or legislation. Examples of the odds paid out for game events are published from time to time by casinos and would be well understood by persons skilled in the art.

House Commission

In addition to the house commission of 5% payable for a winning Banker hand, a house commission payable on a (or any) winning wager may be collected from a player at the time the winning payout is made, but for seated players only, it may be deferred to a later time. Deferred house commission may be settled at the completion of each shoe and collected prior to the commencement of the next shoe: (i) Unless a player requests an earlier settlement; or (ii) Where a player wishes to cease wagering before the end of a shoe; or (iii) At the discretion of casino management.

The amount of house commission not collected prior to the time the winning payout is made may be evidenced by placing a marker button indicating the amount of the house commission owed in the space provided with the number of the player owing such house commission.

Baccarat 'Pairs'

In a preferred embodiment of the present invention, wagers may be placed on outcome events nominated as 'Pairs' where a win occurs if the first two cards dealt to the Player or the Banker (as nominated by the player) constitute a pair and loses on all other outcomes. Players may place a wager on Player Pair, Banker Pair or both and a wager may also be placed on the Tie event occurring. In the preferred example, the One One Two bet may be placed where a wager may be placed on the outcome of each of Banker Pair, Player Pair and Tie.

Figure 2:
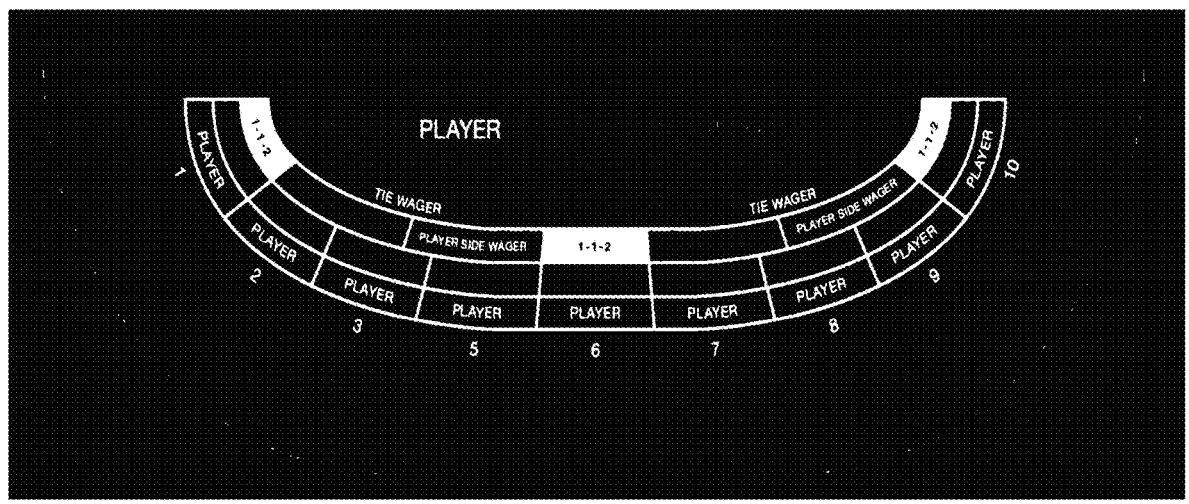
FIG. 2 illustrates a table layout including a wagering layout in accordance with a preferred embodiment of the present invention.
Figure 3:
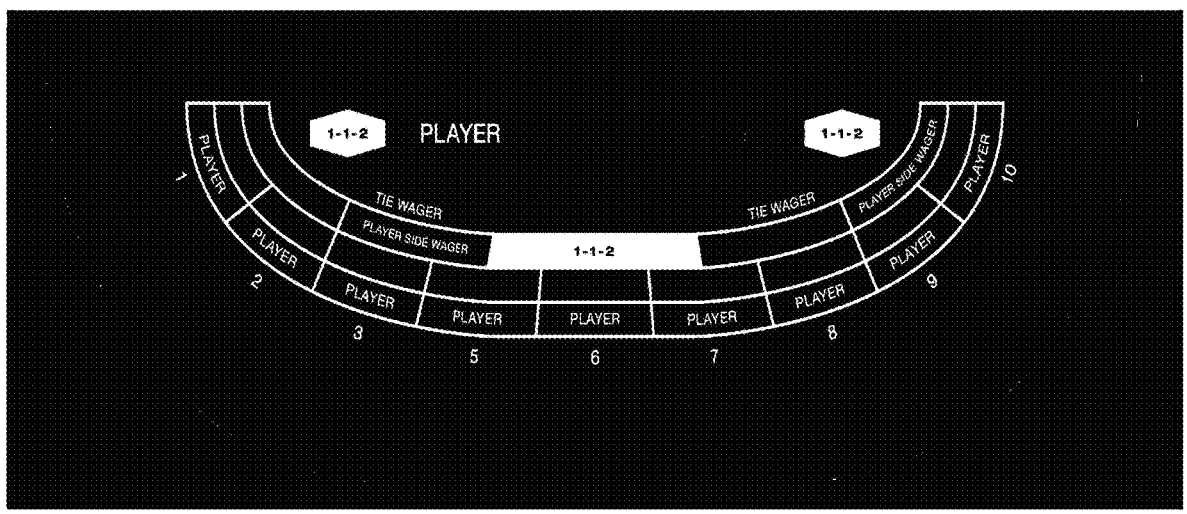
FIG. 3 illustrates a table layout including a wagering layout in accordance with another preferred embodiment of the present invention.

With reference to the table layout depicted in FIG. 2 or its alternative in FIG. 3 the conversion of participants' chips or tokens is catered for to allow the placement of the One One Two multiple bet. Both table layouts of FIGS. 2 and 3 include a singular betting indicia or box indicated '1-1-2' for the One One Two bet. The singular wager, eg single token or chip, placed on the 1-1-2 space will cover the three wagers in the following proportions: a $100 chip is nominally apportioned into four $25 chips placed simultaneously on the eventualities of a Banker Pair, (1×$25 chip), a Player Pair (1×$25 chip) and Tie (2×$25 chip). Utilising eight decks of playing cards, the game of Baccarat is played as per conventional Baccarat with the only difference being that an additional 1-1-2 bet is to be settled upon completion of each round. With this, the following betting options with payouts and indicative house edges will apply.

| Bet | Pays | Edge |
|---|---|---|
| Tie | 8 to 1 | 14.36% |
| Player or Banker Pair | 11 to 1 | 10.36% |

The One One Two payouts are calculated based on Player Pair, Banker Pair and Tie bet payouts of 11 to 1, 11 to 1 and 8 to 1, respectively. Further, these are weighted at 25%, 25% and 50% of the bet respectively. For convenience, the table below provides a summary of how the effective payouts are calculated, net of any losses. For example, a bet on One One Two, with a Single Pair result, has a net payout of 2 to 1, which is calculated as a winning Pair bet (with a proportion of 25%) plus a losing Pair bet (with a proportion of 25%) plus a losing Tie bet (with a proportion of 50%). Mathematically this is calculated as 25% of the bet wins at a payout of 11 to 1, and the remainder of the bet (25% plus 50% which equals 75%) loses, which equals an effective net payout of 2 to 1 on the Single Pair occurrence.

| Effective Payout Net of Losses | Calculation | Net Effective Edge |
|---|---|---|
| Single Pair[1] 2 to 1 | (25% multiplied by 11) minus 75% | 12.36% |
| Tie 3.5 to 1 | (50% multiplied by 9) minus 50% | |
| Double Pair[2] 5 to 1 | (25% multiplied by 11) multiplied by 2 minus 50% | |
| Single Pair & Tie 6.5 to 1 | (25% multiplied by 11) plus (50% multiplied by 8) minus25% | |
| Double Pair & Tie 9.5 to 1 | (25 multiplied by 11) multiplied by 2 plus (50% multiplied by 8) | |

Figure 4:
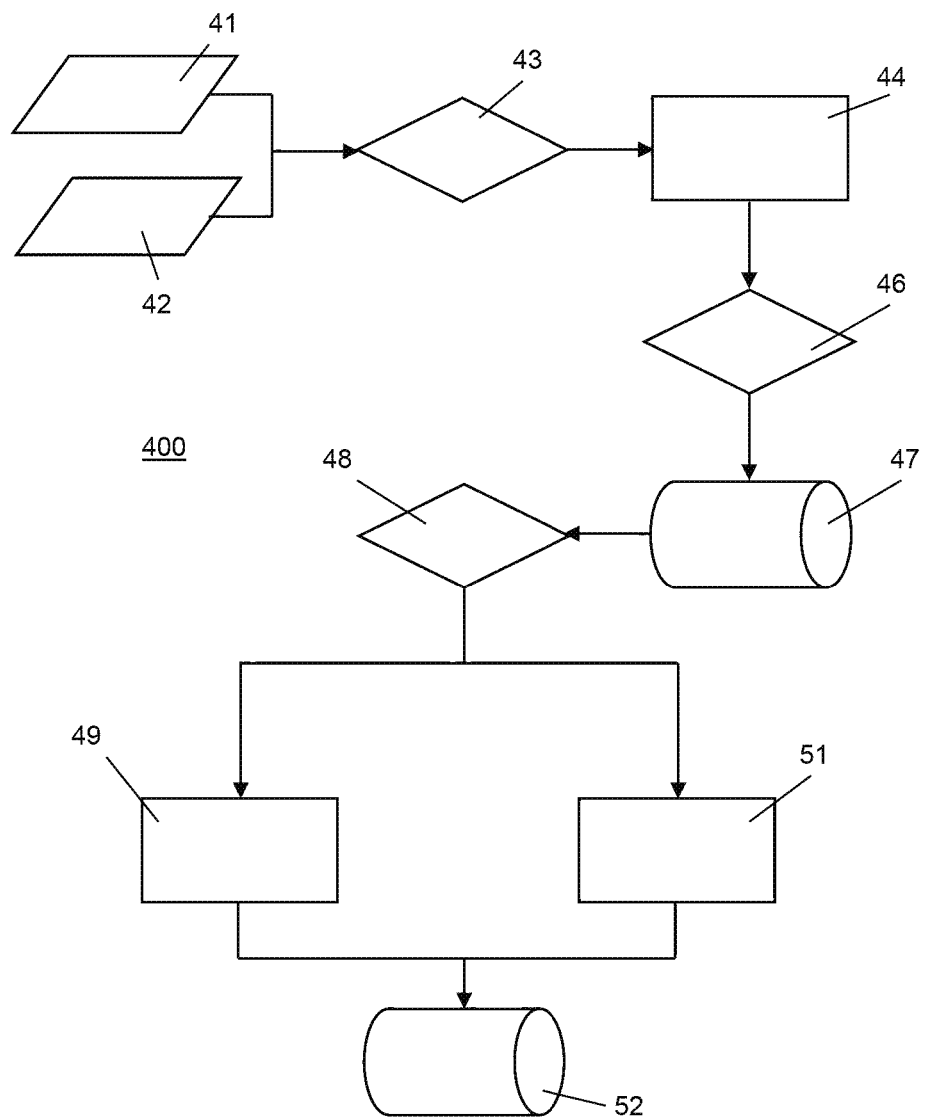
FIG. 4 is a flow chart illustrating the operation of a gaming information system adapted to award a prize in accordance with a preferred embodiment of the present invention.

[1]Result is a Banker pair or Player pair
[2]Result is a Banker pair and Player pair
* All edges are calculated based on eight decks of cards A preferred implementation of embodiments of the present invention noted above is now described with reference to FIG. 4 in which the operation of a gaming information system adapted for facilitating wagering in play and awarding payouts in a Baccarat game is illustrated.

The player tracking system of a gaming information system 400 has the facility to record the bets laid by individual players 41 and also record the Baccarat hand results 42. The inputs 41 and 42 may be entered either manually or by automated arrangement 43. With this input information, the system 400 may calculate each player's pay out for each hand and accumulate the results. The automated input, calculation and accumulation steps are shown at 43 and 46 and, are conducted by any suitable network enabled computer 44, which may comprise a suitable processor such as for example an Intel™ ATOM™ microprocessor configured in the system 400 for card table application. The accumulated results may be stored in a player tracking database 47. The player tracking system also has facility to record within the player tracking database 47 the total bets placed by each player for each hand, and what wagers those bets were placed on (eg, player, banker, tie).

The player tracking system implemented by processor 44 may also accumulate total turnover for each player, and use this figure to determine the value of a player commission that the player has earned. The player commission may be a conventional calculation of a percentage of total turnover to be provided as a total commission for payment to a player 49.

With the benefit of processor means 44 incorporated in the gaming player management system 400 which is operably connected and/or associated with the player tracking system including its player tracking database as well as operably associated with input means for 41, 42 for recording the player wagers and also hand results, the system of this preferred embodiment provides changes to a player tracking system to add the functional ability to:

1. Configure an apportionment of a 1-1-2 bet by allocating portions of a total single wager amount across multiple game outcomes, for example the Pairs events. The apportioned amounts are calculated as a function or in relationship to the likelihood or probabilities of the respective outcome events, as percentage of the total value of the single wager.
2. Record the total 1-1-2 bet accumulated by an individual player for a gaming session.
3. Record the total 1-1-2 bet paid out to an individual for a gaming session.
4. Record the total 1-1-2 bet bonus available to be paid out to an individual.
5. Determine whether total commission amount should be calculated using a standard program commission method 49 or 1-1-2 bet method being the results of the wager value accumulated for the 1-1-2 bet 51.

With respect to determining total player commission, this amount could be calculated using the program commission 49 for standard Baccarat hands being played and/or in addition thereto the 1-1-2 bet accumulated 51, the processor means can determine a payout type by virtue of a decision, shown at 48, to pay either or both these commissions dependent on the individual players' wagering choices at the table as recorded in the system as a player commission to an individual player. The payment of this player commission may also be recorded against the player in the player tracking database 47 as shown at 52.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

The following sections I-VII provide a guide to interpreting the present specification.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this specification", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present specification, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things, does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 2, 3, 4, . . . 9) and non-whole numbers (e.g., 1.1, 1.2, . . . 1.9).

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory)

and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Indication

The term "indication" is used in an extremely broad sense. The term "indication" may, among other things, encompass a sign, symptom, or token of something else.

The term "indication" may be used to refer to any indicia and/or other information indicative of or associated with a subject, item, entity, and/or other object and/or idea.

As used herein, the phrases "information indicative of" and "indicia" may be used to refer to any information that represents, describes, and/or is otherwise associated with a related entity, subject, or object.

Indicia of information may include, for example, a symbol, a code, a reference, a link, a signal, an identifier, and/or any combination thereof and/or any other informative representation associated with the information.

In some embodiments, indicia of information (or indicative of the information) may be or include the information itself and/or any portion or component of the information. In some embodiments, an indication may include a request, a solicitation, a broadcast, and/or any other form of information gathering and/or dissemination.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology are not Limiting

Neither the Title nor the Abstract in this specification is intended to be taken as limiting in any way as the scope of the disclosed invention(s). The title and headings of sections provided in the specification are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognise that the disclosed invention(s) may be practised with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, operations, algorithms or the like may be described in a particular sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VI. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more micro-controllers, one or more digital signal processors) will receive instructions (e.g., from a memory or like device), and execute those instructions, thereby performing one or more processes defined by those instructions.

A "processor" means one or more microprocessors, central processing units (CPUs), computing devices, micro-controllers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fibre optics, including the wires that comprise a system bus coupled to the processor. Transmission media may include or convey acoustic waves, light waves and electromagnetic emissions, such as those generated during radio frequency (RF) and infra-red (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviours of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices that are adapted to communicate with the computer. Any number and type of devices may be in communication with the computer.

In an embodiment, a server computer or centralised authority may not be necessary or desirable. For example, the present invention may, in an embodiment, be practised on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

The invention claimed is:

1. Apparatus for wagering on a Baccarat game having predetermined rules adapted for at least one or more players to participate by wagering on game outcome events comprising:
   a playfield including a gaming layout adapted for placement of game elements and a wagering layout adapted for accepting placement of at least one wager, the wagering layout comprising at least one indicium for accepting placement of an apportioned wager; and
   at least one wagering token;
   wherein one or a combination of the at least one wagering token and the at least one indicium of the wagering layout provides a single wager that has the singe wager's value apportioned to a plurality of outcome events in one action to effect multiple wagers by allocating a predetermined fraction of the total value of the single wager to each of the plurality of outcome events, such that the single wager is directed to a set of Pairs events in Baccarat and the value of the single wager is apportioned to the set of events as follows:
   Banker Pair—25%
   Player Pair—25%
   Tie—50%.

2. The apparatus of claim 1 wherein the Baccarat game is a table game.

3. The apparatus of claim 1 wherein the Baccarat game elements are playing cards.

* * * * *

UNITED STATES PATENT AND TRADEMARK OFFICE
CERTIFICATE OF CORRECTION

| | |
|---|---|
| PATENT NO. | : 11,322,000 B2 |
| APPLICATION NO. | : 16/487606 |
| DATED | : May 3, 2022 |
| INVENTOR(S) | : Yang et al. |

It is certified that error appears in the above-identified patent and that said Letters Patent is hereby corrected as shown below:

In the Claims

Column 20, under - The invention claimed is: Claim 1, Lines 30-31, delete "singe wager's" and insert -- single wager's --.

Signed and Sealed this
Twenty-eighth Day of June, 2022

*Katherine Kelly Vidal*

Katherine Kelly Vidal
*Director of the United States Patent and Trademark Office*